Nov. 3, 1936. H. K. BAKER Re. 20,154

MANUFACTURE OF EXPANDED METAL

Original Filed April 19, 1929 4 Sheets-Sheet 1

INVENTOR
Herbert K. Baker
BY
Symmestvedt & Lechner
ATTORNEYS

Nov. 3, 1936. H. K. BAKER Re. 20,154

MANUFACTURE OF EXPANDED METAL

Original Filed April 19, 1929 4 Sheets-Sheet 2

INVENTOR
Herbert K. Baker
BY
Symmestedt & Lechner
ATTORNEYS

Nov. 3, 1936. H. K. BAKER Re. 20,154

MANUFACTURE OF EXPANDED METAL

Original Filed April 19, 1929 4 Sheets-Sheet 3

INVENTOR
Herbert K. Baker
BY
Symmestvedt & Lechner
ATTORNEYS

Nov. 3, 1936. H. K. BAKER Re. 20,154

MANUFACTURE OF EXPANDED METAL

Original Filed April 19, 1929 4 Sheets-Sheet 4

INVENTOR
Herbert K. Baker
BY
Symestedt + Lechner
ATTORNEYS

Reissued Nov. 3, 1936

Re. 20,154

UNITED STATES PATENT OFFICE 20,154

MANUFACTURE OF EXPANDED METAL

Herbert K. Baker, Kokomo, Ind.

Original No. 1,890,173, dated December 6, 1932, Serial No. 356,331, April 19, 1929. Application for reissue September 4, 1936, Serial No. 99,530

6 Claims. (Cl. 164—6.5)

This invention relates to the manufacture of expanded metal and has particular reference to the splitting and forming of blanks for expansion.

Generally considered the objects of the invention include increasing the economy with respect to the time and materials employed in producing lath, increasing the life of the slitting mechanism and simplifying the construction and operation of apparatus of this character.

More specifically I contemplate the use of dies or punches of two or more times the width of the strands to be produced in the lath and thus provide punches of greater strength and durability and permit the strands of the latch to be made of smaller width. The metal employed in producing a given size expanded sheet is thus materially reduced.

I also contemplate the use of a single set of slitting punches in operating more than once on a given area of a blank in order to produce spaced and staggered slits therein.

My invention also utilizes sets of forming dies mounted to reciprocate in the same press members with the slitting punches and thereby form ribs or grooves in the blanks which are configured and arranged to facilitate opening out of the sheet during the expanding operation.

How the foregoing together with other objects and advantages are obtained will be clear from a consideration of the following description taken with the accompanying drawings which illustrate the preferred embodiment of the invention and in which Fig. 1 is an elevational view of a reciprocating press mechanism suitable for carrying out the method of the present invention, the view being taken from the feeding side;

Fig. 6 is a top plan view of a group of the slitting punches mounted in the lower press member;

Fig. 6a is a view of a group of the upper punches adapted to cooperate with the group illustrated in Fig. 6, the view being similar to Fig. 6, but taken as indicated by the line 6a—6a of Fig. 5;

Figs. 7 and 8 are side and cutting edge views respectively of one of the slitting punches mounted in the upper press member;

Figs. 9 and 10 are similar views of one of the slitting punches mounted in the lower press member;

Figure 13:
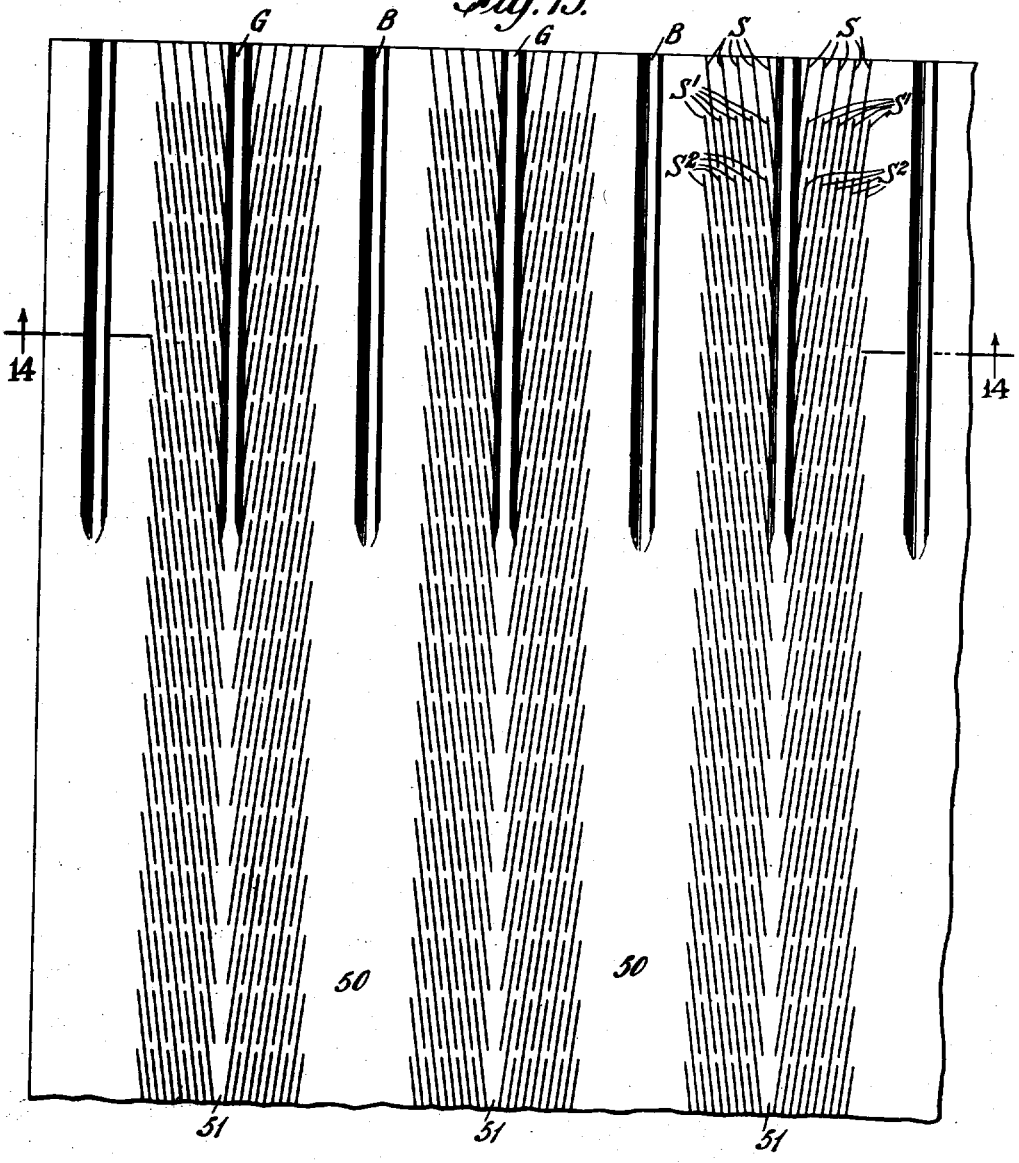
Figure 14:
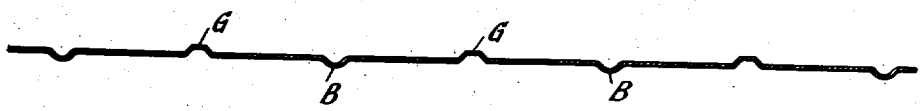

Figs. 11 and 12 illustrate details of the spacing members employed between certain of the punches; and Figs. 13 and 14 are face and sectional views respectively of my improved partially slitted and formed blank, the latter being taken substantially as indicated by the line 14—14 on Fig. 13.

Referring now more particularly to the drawings the upper and lower press members are indicated by the reference characters 15 and 16 respectively, the upper one, 15, of which is mounted to reciprocate on the vertical guide shafts 17 which are arranged at the corners of the press.

Upper and lower slitting dies or punches 18 and 19 are mounted in the press members 15 and 16 respectively, the sets for each of the press members being adjustably supported in their operative positions by means of the cooperating wedges 20 and 21 which are mounted in recesses extending transversely of the press. Adjusting bolts 22 are provided at the ends of the wedges in order to raise or lower the punches as desired. Wedge blocks 29 with adjusting bolts 30 serve to secure the wedges 20 and 21 in adjusted position.

Figure 3:
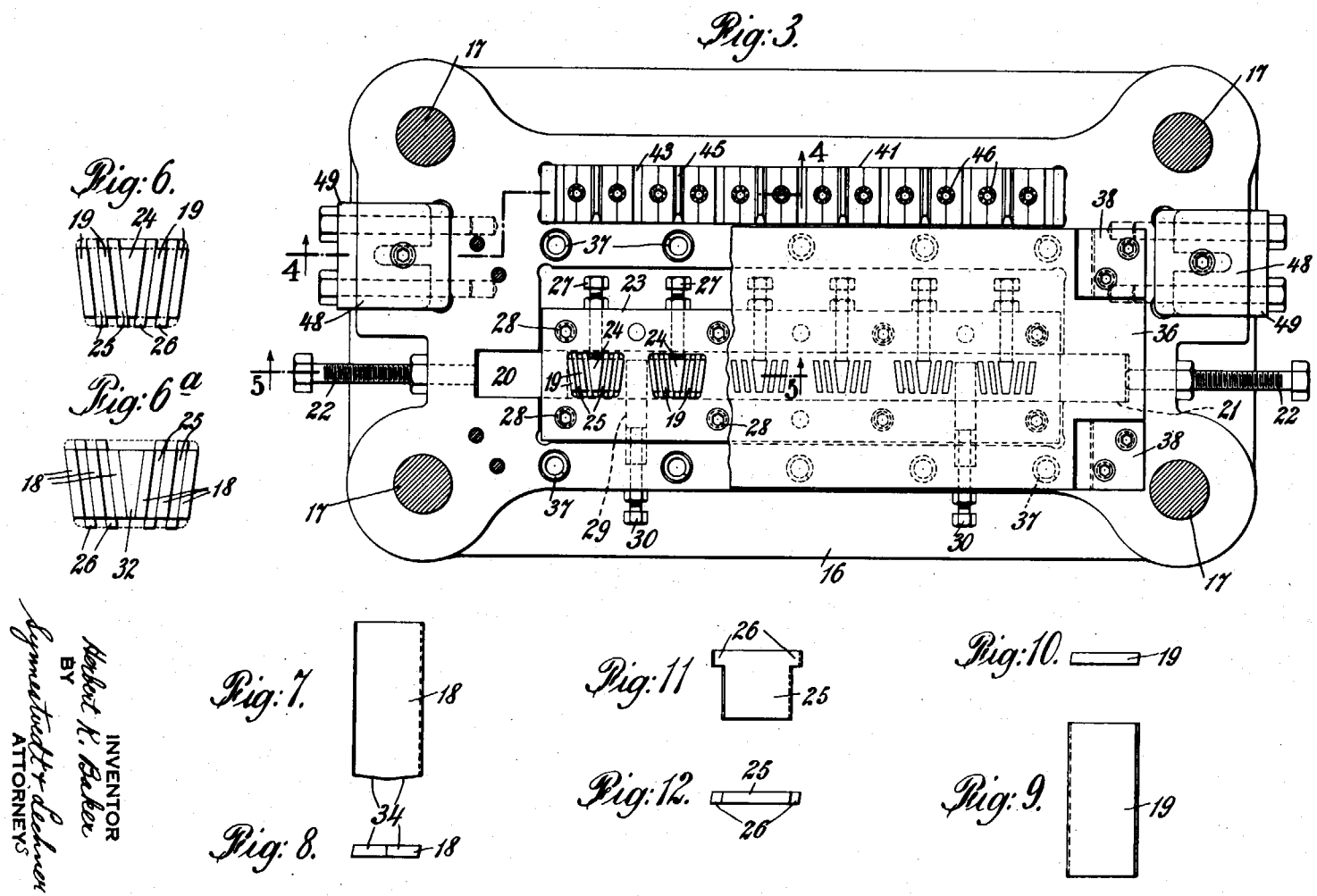
Fig. 3 is a top plan view of the lower press member, certain of the parts being broken away in order to show the mounting of the punches therein.

The punches 19 of the lower press member 16 (see Fig. 3) are arranged in groups spaced from each other and overlying the wedges 20 and 21, the groups being mounted in their spaced relation by means of the holder member 23 having apertures adapted to receive the groups. As will be seen from inspection of Figures 3, 5, 6 and 9 to 12, each group of punches which is associated with the lower press member 16 comprises a pair of slitting punches 19 arranged on each side of a central wedge-like punch 24, those on opposite sides being oppositely angled or inclined with respect to the direction of feed thru the apparatus. Spacing members 25 are provided between the cutters or punches 19 which are provided with lugs 26 adapted to overlie and engage co-operating shoulders provided on opposite sides of the apertures formed in the slitting punch holder member 23. Each group when assembled and positioned in its aperture in the member 23 is rigidly secured in place by means of the adjusting bolt 27, the same being threaded into an edge of the member 23 and bearing against the large edge of the wedge cutter 24.

The slitting punch holder member 23 is secured in position by means of the bolts 28 which are tapped into the press member 16 at spaced intervals on either side of the wedges 20 and 21.

The slitting punches associated with the upper press member 15 are arranged in groups which are complementary to those secured in the lower press member and are secured in position by means of a slitting punch holder 31 which, in all essential respects, is identical with the member 23 associated with the lower groups. Each group in the upper set, however, comprises a wedge 32 (see Figs. 5, 6a, 7 and 8) which terminates short of the cutting edges of the punches 18 arranged on each side thereof. It should be observed that three punches 18 are mounted on either side of the wedge 32 in each of the upper groups, the same being inclined or angled similarly to those in the lower groups and being held in spaced relation by means of the spacers 25 which are mounted in the holder member 31 in the same manner as the spacers associated with the lower groups. Adjusting bolts 33 are also provided in this instance in order to secure the groups of wedges 18 in their operative position and it might here be noted that the upper slitting punches 18 are provided with double tapered cutting surfaces 34 in order to reduce distortion in slitting the blanks (see Figs. 2, 7 and 8).

Figure 1:
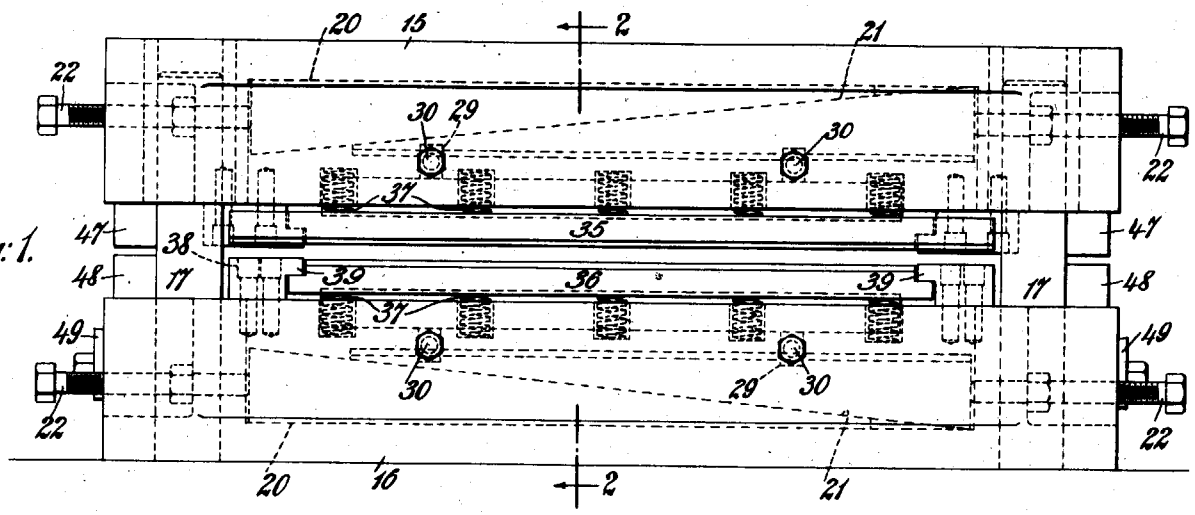
Figure 2:
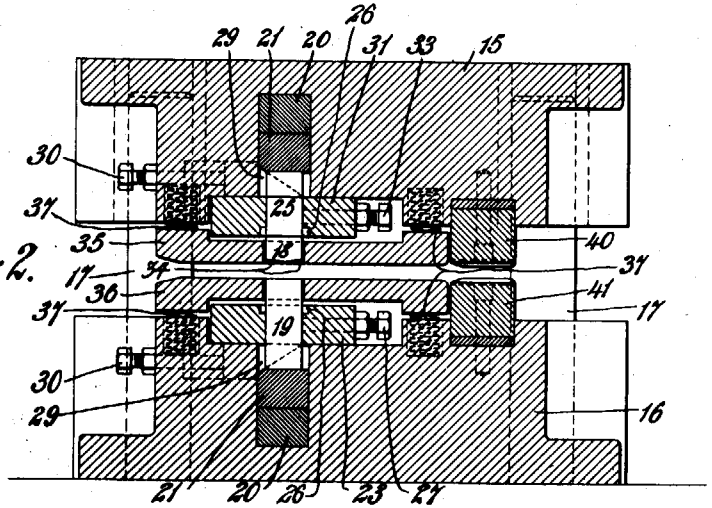
Fig. 2 is a vertical sectional view taken as indicated by the line 2—2 of Fig. 1.

Upper and lower stripper plates 35 and 36 respectively having openings adapted to pass the punches in the upper and lower groups are resiliently supported on each of the press members by means of the springs 37 as most clearly illustrated in Figs. 1 and 2. The stripper plates are restrained as against outward movement with respect to the present members with which they are associated by means of the brackets 38 which are suitably bolted to the press members and which are provided with lugs 39 which engage over cooperating shoulders formed at the cut-out corners of the plates 35 and 36 (see Figs. 1 and 3).

Figure 4:
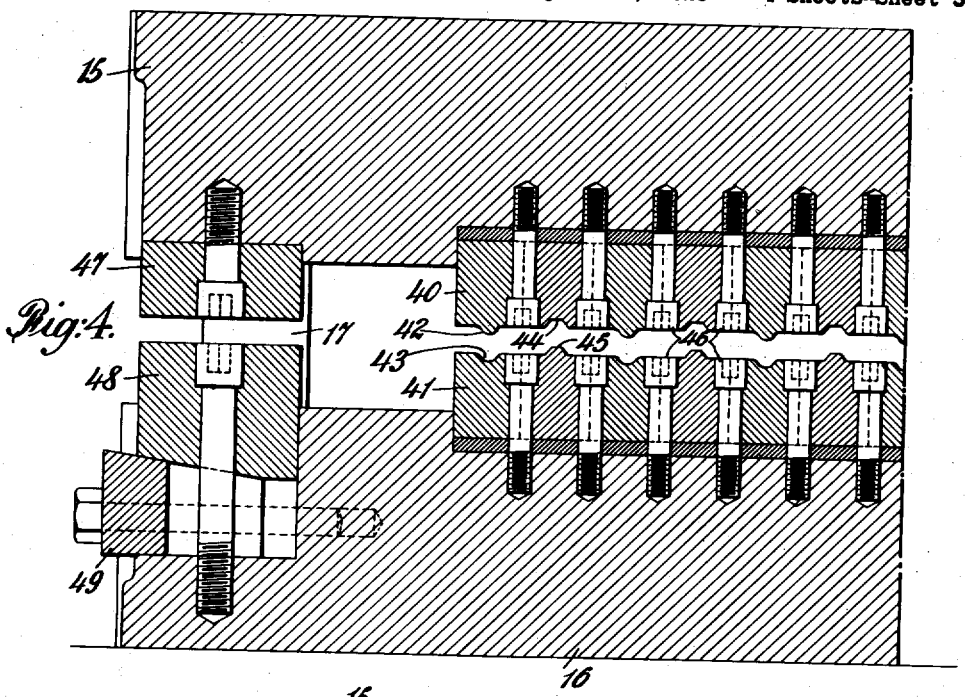
Fig. 4 is an enlarged sectional view taken as indicated by the lines 4—4 of Fig. 3.
Figure 5:
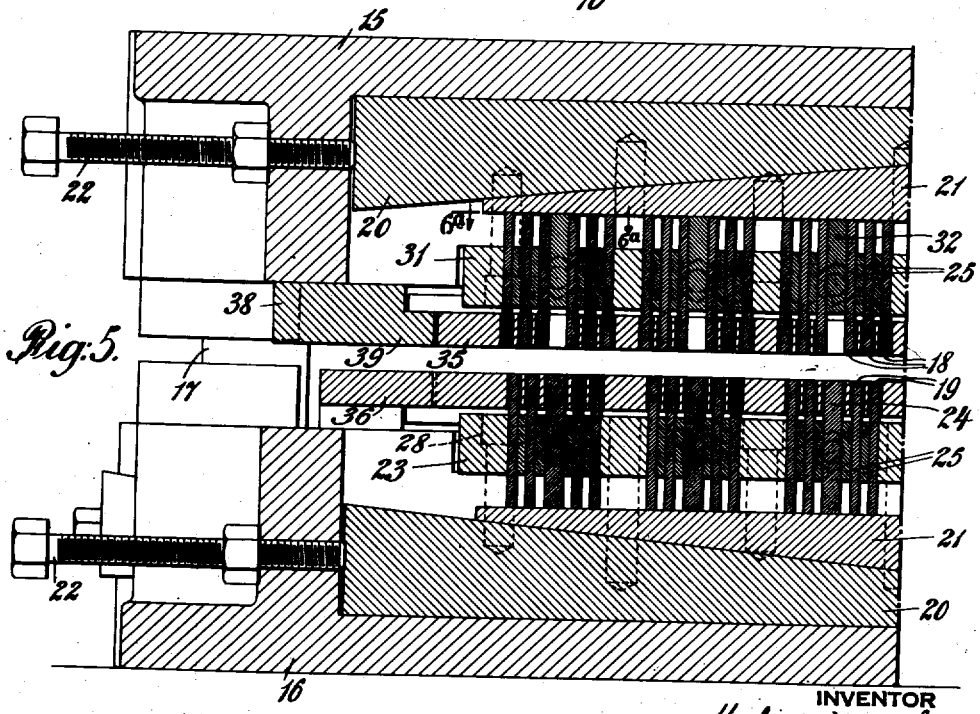
Fig. 5 is a view similar to Fig. 4 but taken as indicated by the line 5—5 of Fig. 3.

Beyond the slitting mechanism with respect to the direction of feed thru the apparatus I have provided co-operating upper and lower swaging or forming dies indicated in general by the reference characters 40 and 41 respectively in Figs. 2 and 4. The dies are provided with cooperating working surfaces 42, 43 and 44, 45 which are adapted to produce alternate rounded and angled grooves or ribs respectively, extending longitudinally of the blanks, the same being arranged to project on opposite sides. That is, all the rounded grooves project on one side of the blanks while the angled grooves project on the other. The forming dies 40 and 41 are preferably made in sections or pieces (see Figs. 3 and 4) and are suitably secured to the press members by means of the bolts 46.

Stops 47 and 48 are secured to the upper and lower press members 15 and 16 respectively. The lower stops 48 may be provided with an adjusting mechanism indicated at 49 in Fig. 4 in order that the stroke of the reciprocating press member 15 may be suitably limited.

Referring now to Figs. 13 and 14 in connection with the others, particularly Nos. 4, 6 and 6a it should be observed, to begin with, that the general type of lath which the apparatus is particularly adapted to produce is, what is commonly referred to as "high rib lath", i. e. a lath having relatively deep ribs between the expanded areas in order to give the sheet rigidity, in contradistinction to what is commonly termed "flat rib lath" which has relatively shallow beads between the expanded areas. Thus, it will be observed, that the groups of slitting punches according to my invention are relatively widely spaced in order to leave the relatively broad unslitted areas indicated at 50 in Fig. 13 for the purpose of providing sufficient metal between the slitted areas for folding up into the relatively high ribs by a subsequent expanding operation.

In connection with the operation of the apparatus, reference should first be made to Figs. 6 and 6a which clearly illustrate how the cutting edges of the upper and lower slitting punches 18 and 19 respectively, cooperate when the upper press member descends to produce the groups of slits across the blanks. The slits produced by one stroke of the press are indicated at S at the top of Fig. 13. Before the second stroke of the press the blank is advanced by the feeding mechanism (not herein described) a distance just a little greater than half of the length of the slitting edges of the punches 18 and 19. The second stroke of the press produces the slits indicated by the character $S^1$ and it should be noted that the slitting punches are angled longitudinally of the sheet to an extent which causes the overlapping sets of slits to fall midway between those produced by each immediately preceding operation. The slitting is carried out in the above manner throughout the entire length of the sheet and it should be observed that on the third operation or stroke of the press, the slits $S^2$ which are produced, fall in alignment with those produced by the first operation although spaced slightly therefrom. Thus the correlation between the inclination of the punches and the amount the blank is advanced per stroke of the press, determines the dimensions of the connections or bonds between the expanded strands of the completed lath.

As the blank advances thru the press it is engaged by the cooperating forming dies 40 and 41 herein before considered which successively swage the sheet to produce the rounded beads B in the relatively wide unslitted areas 50 and the angled grooves G in the narrow unslitted strips extending between the reversely inclined slits of each group. The arrangement and configuration of the unslitted areas and ribs will be clear from inspection of Figs. 13 and 14, the relatively narrow unslitted strips just referred to being indicated by the reference numeral 51. It is also to be observed at this point that the angled grooves G which are centered on the relatively narrow unslitted strips 51 are of sufficient width to take in or include a portion of the slitted area at each side. The legs of the grooves G preferably extent approximately at right angles to each other. The beads B and the grooves G are arranged and configured as indicated in order to facilitate subsequent preopening and expanding operations such as are disclosed in my co-pending application, Serial Number 357,643, filed April 24, 1929.

The following advantages should be noted in connection with my improved method of and apparatus for preparing blanks for expanding purposes:

Firstly, the arrangement and method of operating the slitting punches including the angular disposition of the punches and the manner of feed of the blanks therethrough, permit the use of relatively thick and therefore rugged punches in producing a lath having strands of a given width. To be more exact the slitting punches are approximately double the width of the strands to be produced thereby. This feature is particularly advantageous, as will be understood by those skilled in the art, in view of the fact that considerable difficulty has been encountered heretofore in providing punches, for lath having relatively narrow or even average strands, which would not rupture or warp after a relatively short period of use. Very narrow punches, obviously, are not satisfactory from a commercial or practical standpoint for the reason that, even if made of the finest steel, they are too thin and weak to hold up under the heavy strains to which they are subjected.

Secondly, and as a corollary to the advantage just noted, the double width punches and the method of operating the same permit the manufacture of lath having narrower strands than was possible heretofore, with the result that considerable material may be saved in the manufacture of an expanded sheet of given dimensions. This effects a very material economy in certain of the fields in which metal lath is used which do not require a particularly heavy finished product although it is to be understood that such lath, when the unslitted areas 50 are suitably folded or rolled into relatively deep ribs, has sufficient rigidity and strength for all normal uses.

Thirdly, the blanks produced by the method and apparatus disclosed herein are ribbed in such a manner as to greatly facilitate a subsequent expanding operation by a reduction in the strains to which the strands are subjected during the expanding.

Finally, it should be observed that the arrangement and mounting of the slitting punches and forming dies is not only very rugged, but also easily accessible for purposes of inspection or repair.

While I have described my invention in connection with the particular embodiment illustrated in the drawings, I do not wish to limit myself to the exact number and arrangement of punches and forming dies in view of the fact that these may be altered somewhat without departing from the spirit or scope of the invention.

It should be noted that the apparatus herein disclosed is also disclosed and claimed in my copending application, Serial No. 538,924, filed May 21st, 1931.

What I claim is:—

1. In a method for slitting metallic blanks for expansion into stranded lath, the steps of forming groups of parallel slits in the blank, the slits of one group being reversely inclined with respect to the slits of another group, and subsequently forming similar groups of parallel and reversely inclined slits at least partially within the area of the blank first slitted, the slits of the second groups being extended between and parallel to slits of the first groups.

2. In a method for slitting metallic blanks for expansion into stranded lath, the steps of slitting an area of the blank with a series of cutting edges to produce relatively wide strands therein, and subsequently slitting said relatively wide strands with the same cutting edges to provide relatively narrow strands.

3. In a method for slitting metallic blanks for expansion into stranded lath, the steps of forming a plurality of groups of parallel slits, the slits in one group being reversely inclined with respect to the slits in another group, to provide relatively wide strands, and subsequently producing similar groups of parallel and reversely inclined slits at least partially within the boundaries of the groups first slitted, the slits of the second groups being extended between slits of the first groups and being parallel thereto, whereby the relatively wide strands are divided into relatively narrow strands.

4. In a method for slitting metallic blanks for expansion into lath having strands of a predetermined width, the steps of utilizing a series of cutting edges to produce a group of parallel slits with their ends substantially in alignment with each other to provide a group of relatively wide strands, and subsequently producing with the same cutting edges an additional and similar group of slits the individual slits of which are parallel to and extend between slits of the first group, whereby said relatively wide strands are divided into strands of said predetermined width.

5. In the manufacture of expanded mesh-work sheets from metallic blanks, the steps of producing, in longitudinally extending areas of the blanks, groups of parallel but diagonally extended slits spaced apart from each other a distance greater than the width of the strands to be produced, the slits in one longitudinally extending area of the blank being diagonally extended in an opposite direction from the slits in an adjacent longitudinally extended area; successively forming similar and additional groups of slits in said longitudinally extending areas and with the slits of each successive group in each area extended between and parallel to slits of the immediately preceding group, in order to divide or cut the strips of metal lying between slits of the preceding group, and thus produce strands of the desired predetermined width; and subsequently subjecting the slitted sheets to an expanding operation.

6. In a method for manufacturing lathing having strands of a predetermined width from blank sheets, the steps of producing groups of parallel slits in the sheets spaced from each other a distance greater than the predetermined width of the strands to be produced, to provide groups of relatively wide strands, the slits of one group being inclined oppositely with respect to the slits of an adjacent group, subsequently producing additional and similar groups of slits in the sheets the individual slits of which are parallel to and extend between slits of the first groups, whereby said relatively wide strands are divided into strands of said predetermined width, and then subjecting the slitted sheets to an expanding operation.

HERBERT K. BAKER.